US011250130B2

(12) United States Patent
Shi et al.

(10) Patent No.: US 11,250,130 B2
(45) Date of Patent: Feb. 15, 2022

(54) METHOD AND APPARATUS FOR SCANNING GINORMOUS FILES

(71) Applicant: Barracuda Networks, Inc., Campbell, CA (US)

(72) Inventors: Fleming Shi, Scotts Valley, CA (US); Joseph Thomas Comeau, Los Gatos, CA (US)

(73) Assignee: Barracuda Networks, Inc., Campbell, CA (US)

( * ) Notice: Subject to any disclaimer, the term of this patent is extended or adjusted under 35 U.S.C. 154(b) by 284 days.

(21) Appl. No.: 16/549,978

(22) Filed: Aug. 23, 2019

(65) Prior Publication Data
US 2020/0372107 A1 Nov. 26, 2020

Related U.S. Application Data

(60) Provisional application No. 62/851,852, filed on May 23, 2019.

(51) Int. Cl.
*G06F 21/56* (2013.01)
*G06F 21/62* (2013.01)

(52) U.S. Cl.
CPC .......... *G06F 21/565* (2013.01); *G06F 21/562* (2013.01); *G06F 21/56* (2013.01); *G06F 2221/2119* (2013.01)

(58) Field of Classification Search
CPC .. G06F 40/205; G06F 16/8365; G06F 40/131; G06F 21/565; G06F 21/56; G06F 21/62; G06F 21/562; G06F 2221/2119
See application file for complete search history.

(56) References Cited

U.S. PATENT DOCUMENTS

| | | | |
|---|---|---|---|
| 9,268,689 B1* | 2/2016 | Chen | G06F 12/1027 |
| 2003/0023864 A1* | 1/2003 | Muttik | H04L 63/145 |
| | | | 726/26 |
| 2015/0286437 A1* | 10/2015 | Coronado | G06F 3/0619 |
| | | | 711/162 |
| 2016/0212157 A1* | 7/2016 | Choi | H04L 63/145 |
| 2016/0224788 A1* | 8/2016 | Coronado | G06F 21/566 |
| 2018/0268138 A1* | 9/2018 | Quintero Ramirez | |
| | | | G06F 21/561 |
| 2018/0300315 A1* | 10/2018 | Leal | G06F 40/268 |

* cited by examiner

*Primary Examiner* — Jayesh M Jhaveri

(57) ABSTRACT

A new approach is proposed that contemplates systems and methods to support scanning through a file of large size without having to load the entire file into memory of single file parser or scanner. The proposed approach is configured to divide a ginormous file to be parsed and scanned into a plurality of sections following a divide and conquer scheme. The plurality sections of the file are then parsed and loaded to a plurality of file scanners each configured to scan its allocated file section of a certain file type. Each of the plurality of file scanners is then configured to extract and evaluate from its allocated section file parts that can be harmful to a user of the file and/or expose sensitive/protected information of the user. The scan results are then collected, analyzed, and report to a user with a final determination on the malicious content and sensitive data.

22 Claims, 3 Drawing Sheets

METHOD AND APPARATUS FOR SCANNING GINORMOUS FILES

CROSS-REFERENCE TO RELATED APPLICATIONS

This application claims the benefit of U.S. Provisional Patent Application No. 62/851,852, filed May 23, 2019, and entitled "Method and Apparatus for Scanning Ginormous Files," which is incorporated herein in its entirety by reference.

BACKGROUND

As computer file storage, such as cloud-based file storage, gets larger in capacity, the files stored on the computer file storage are also getting larger and becoming ginormous. These ginormous files may include, e.g., comma-separated values (CSV) file content, which stores tabular data (numbers and text) in plain text and uses a comma to separate values, and/or tab-separated values (TSV) file content, which uses simple text format for storing data in a tabular structure, e.g., database table or spreadsheet data, for exchanging information between databases. The ginormous files having CSV and/or TSV content may pose a major problem in cloud-based file storage platforms today as a lot of such ginormous files are database dumps and other logs, which could contain active malicious content and/or sensitive data of a user. Here, the malicious content may include but is not limited to one or more web URLs to one or more unsafe fake websites and/or attachments such as MS Office documents, PDF documents, binary files, scripts, and other artifacts that may contain active malicious content. The sensitive data of the user may include but is not limited to personal, financial, or confidential information of the user and/or entities the user is associated with. In order to protect sensitive data of the user and to protect him/her from being attacked by the malicious content, these files need to be scanned for the malicious content and/or sensitive data in a timely manner. Many of today's file scanning mechanisms, however, are unable to scan files beyond certain size, e.g., larger than hundreds of megabytes, efficiently and timely, making these scanning mechanisms unsuitable for scanning of ginormous files. It is thus desirable to be able to scan these ginormous files with flexibility and scalability.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF EMBODIMENTS

Figure 1:
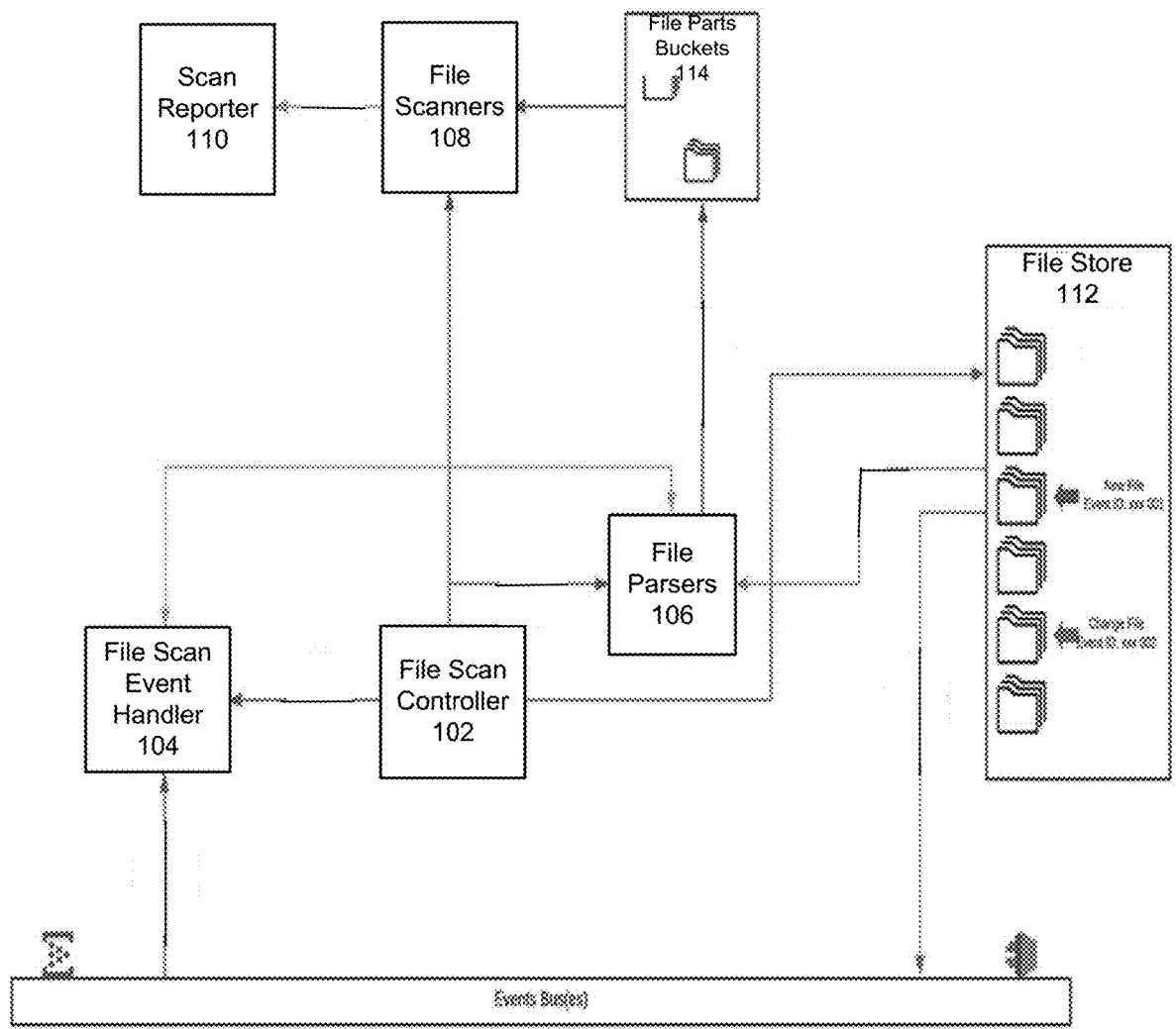
FIG. 1 depicts an example of a diagram of a system that supports ginormous file scanning according to some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A new approach is proposed that contemplates systems and methods to support scanning through a file of large size without having to load the entire file into memory of single file parser or scanner. In some embodiments, the proposed approach is configured to divide a ginormous file to be parsed and scanned into a plurality of sections/portions/pieces following a divide and concur scheme. The plurality sections of the ginormous file are then parsed and loaded to a plurality of file scanners each configured to scan its allocated file section of a certain file type. In some embodiments, the number of file parsers and scanners being utilized for the scanning of the ginormous file is determined based on the size of the ginormous file and the amount of computing resources (e.g., memory and CPU power) available, as well as performance requirements for the file scan process. Each of the plurality of file scanners is then configured to extract and evaluate from its allocated section file components that can be harmful to a user of the file and/or expose sensitive/protected information of the user. The scan results are then collected, analyzed, and report to a user with a final determination on the malicious content and sensitive data.

By dividing a ginormous file into multiple portions and allocating them to a plurality of file parsers and scanners, the proposed approach is capable of scanning the ginormous file in an efficient manner in real time, while not bursting through all the computing resources available on the file scanning system. During the file scanning process, the entire file is never loaded into a memory space of any single file parser or scanner for analysis. The proposed approach decouples asynchronous processing between parsing of the file via the file parsers and scanning of the file sections via the file scanners and thus making scanning of the ginormous file scalable with no limit on its file size given adequate computing resources. In addition, the proposed approach provides infinite pluggability of the file scanners for specialized scanning and analysis of each file components, wherein such analysis can range from data leakage protection to malware scanning and more.

FIG. 1 depicts an example of a system diagram 100 of a system that supports ginormous file scanning. Although the diagrams depict components as functionally separate, such depiction is merely for illustrative purposes. It will be apparent that the components portrayed in this figure can be arbitrarily combined or divided into separate software, firmware, and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes a file scan event handler 102, a file scan controller 104, a plurality of file parsers 106, a plurality of file scanners 108, a file scan reporter 110, a file store 112, and a plurality of file parts buckets 114. Each of these components of the system 100 runs on a host, which includes one or more processors with software instructions stored in a storage unit such as a non-volatile memory (also referred to as secondary memory) of the host for practicing one or more processes. When the software instructions are executed by the one or more processors of the host, at least a subset of the software instructions is loaded into a memory unit (also referred to as primary memory) by the host, which becomes a special purposed one for practicing the processes. The processes may also be at least partially embodied in the host into which computer program code is loaded and/or executed, such that, the host becomes a special purpose computing unit for practicing the processes. When implemented on a general-purpose computing unit, the computer program code segments configure the computing unit to create specific logic circuits. In some embodiments, each host can be a computing device, a communication device, a storage device, or any computing device capable of running a software component. For non-limiting examples, a computing device can be, but is not limited to, a server computer, a laptop computer, a desktop computer, a tablet, a Google Android device, an iPhone, an iPad, a set-top box, a video game console, an Internet of Things (IoT) device, and a voice-controlled speaker or controller. Each host has a communication interface (not shown), which enables the engines to communicate with each other, the user, and other devices over one or more communication networks following certain communication protocols, such as TCP/IP, http, https, ftp, and sftp protocols. Here, the communication networks can be, but are not limited to, internet, intranet, wide area network (WAN), local area network (LAN), wireless network, Bluetooth, WiFi, mobile communication network, corporate network, enterprise network, campus network etc. The physical connections of the network and the communication protocols are well known to those of skill in the art.

In the example of FIG. 1, the file scan controller 102 is configured to algorithmically allocate scanning resources for a file scanning process based on available computing resource/power, storages and memories, and a target size of the file to be scanned. In some embodiments, the file scan controller 102 is configured to make an initial determination on the scanning resources to be allocated in terms of number of a plurality of file parsers 106 and/or file scanners 108, allocated based on one or more of telemetry information (e.g., computing power and storage capacities) of each of the file parsers 106 and/or file scanners 108, the type and/or size of the file to be scanned, and performance requirements for the file scanning task (e.g., how fast scanning of the file needs to complete). In some embodiments, the file scan controller 102 is configured to make adjustment to the plurality of file parsers 106 and/or file scanners 108 by adding or removing one or more file parsers 106 and/or file scanners 108 from the current set of file parsers 106 and/or file scanners 108 and to provide the telemetry information of the updated set of the plurality of file parsers 106 and/or file scanners 108 to the file scan event handler 104 during file scan event handling.

In the example of FIG. 1, the file store 112 is configured to store and maintain a plurality of files to be scanned for malicious content and/or sensitive data. In some embodiments, the file store 112 is configured to monitor file activities and create a file scan event with a new event ID when a new file is added to the file store 112 (e.g., Event ID: xxx 001) or a change/edit happens to an existing file in the file store 112 (e.g., Event ID: xxx 002), indicating that the new or existing file needs to be scanned, or when an existing file is removed from the file store 112. Once a file add/change happens and a new file scan event has been created, the file store 112 is then configured to populate the file scan event to the file scan event handler 104 for processing via some form of an event bus or an interrupt mechanism.

In the example of FIG. 1, the file scan event handler 104 listens for file scan events related to new file add, existing file update and removal. Once a file scan event is detected, the file scan event handler 104 is configured to trigger a file scanning process by providing with metadata of the file to be scanned to the file scan controller 102 wherein such metadata includes but is not limited to file location in the file store 112, file ID, file size, file type and last change timestamp. The file scan controller 102 is then configured to retrieve the file to be scanned from the file store 112 and provide the file to the plurality of file parsers 106. In some embodiments, the file scan event handler 104 is also configured to listen for additional file scan events from the file scan controller 102 related to the file scanning process, wherein such additional file scan events include but are not limited to file scan completion percentage, file scan success and failure indicators, and output signals related to the identified file contents which can be malicious or sensitive. In some embodiments, the file scan event handler 104 is configured to pass certain data, which includes segment information of the file to be scanned, directly to the file parsers 106 via a communication mechanism.

In the example of FIG. 1, each of the file parsers 106 is configured to accept the file to be scanned from the file store 112 and extract one or more file components/parts/portions from the file based on a file parsing approach. In some embodiments, a divide and conquer approach is adopted wherein the file is divided into a plurality of sections and each of the file parsers 106 is configured to parse a certain section of the file based on its set scan boundaries from beginning of the file (BOF) to the end of the file (EOF). Each file parser 106 is configured to read from its assigned section of the file and extract all file components in the assigned section. Here, types of the extracted file components can be but are not limited to simple text, URL links, binary document portions/blobs, binary executable components, text-based scripts, which can be but are not limited to macros, Javascripts or Powershell scripts, and other forms of parts based on Multipurpose Internet Mail Extensions (MIME) classification. Once the file parts have been extracted, each of the file parsers 106 is configured to send the file parts to a corresponding file parts bucket 114. Here, each of the plurality of file parts buckets 114 is configured to maintain file parts of a specific file type.

In the example of FIG. 1, each of the plurality of file scanners 108 is configured to scan a set of file parts retrieved from its corresponding file parts bucket 114 of a certain file type to identify malicious content and/or sensitive data. Each file scanner 108 is specialized to handle the file parts of a specific file type including but not limited to URL, binary executable, text-based script and other type of file parts based on MIME as listed above. In some embodiments, multiple file scanners 108 can be utilized to scan the specific type of file parts when there are a large number of file parts of such type in the file and there is no limitation on how many file scanners 108 can be utilized per file type. In some embodiments, the plurality of file scanners 108 are configured to scan and analyze their file parts by utilizing one or more of file content analysis, heuristics, user behavior analysis, and sandboxing of identified malicious content and/or sensitive data. Once the scanning is complete or an error has occurred, the plurality of file scanners 108 are configured to provide the identified malicious content and/or sensitive data to the file scan reporter 110.

In the example of FIG. 1, the file scan reporter 110 is configured to collect file scan results from the plurality of file scanners 108 via either a push or a pull mechanism. Based on a composite set of collected file scan results, the file scan reporter 110 is configured to make a final determination/verdict of the malicious content and/or sensitive data using a user-specified/predefined risk criteria and report the final determination to a user of the file. For a non-limiting example, file scan results that meet or exceed the predefined risk criteria are deemed to be malicious or sensitive. In some embodiments, the file scan reporter 110 is configured to make the final determination in a fast-tracked manner based on the file scan results meeting or exceeding one or more minimal satisfactory decision points when the file scan process needs to be completed in real time or within a certain short period of time.

Figure 2:
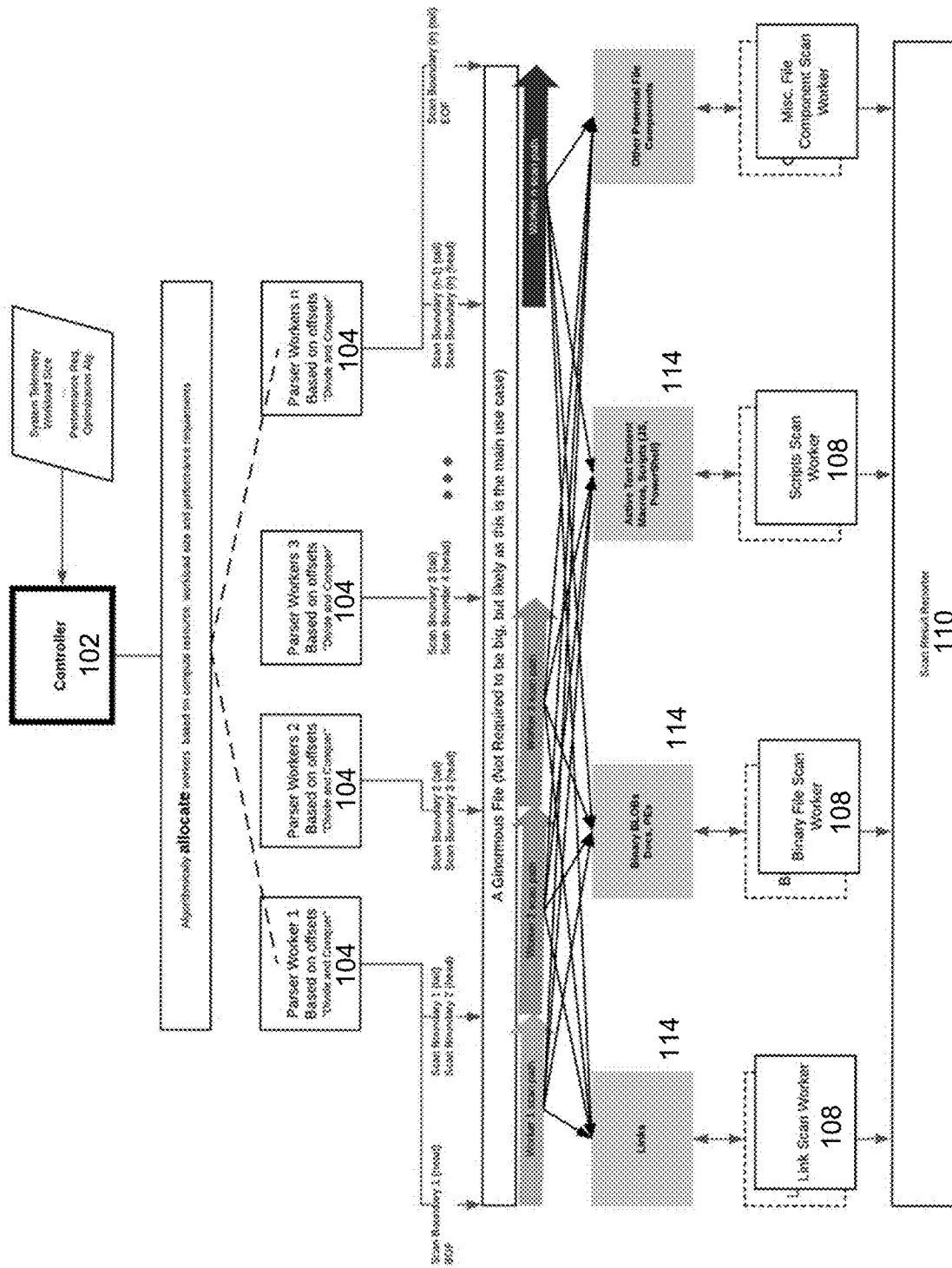
FIG. 2 depicts an example of a diagram illustrating interactions among various components depicted in FIG. 1 during a file scan process according to some embodiments.

FIG. 2 depicts an example of a diagram illustrating interactions among various components depicted in FIG. 1 during a file scan process. As shown by the example of FIG. 2, the file scan controller 102 algorithmically allocates a plurality of file parsers 106 and/or file scanners 108 for the file to be scanned based one or more of telemetry information of the computing devices, the type and/or size of the file to be scanned, and performance requirements for the file scan process. Each of the allocated file parsers 106 then parse and extract parts from a section of the file (which can be ginormous in size) via a divide and conquer approach that sets scan boundaries of head and tail for each file parser 106 from BOF to EOF. The file parts extracted by the file parsers 106 are stored into a plurality of file parts buckets 114 based on their types, e.g., URL inks, binary documents or executables, active text content macros and scripts, and other types of file parts. Each of a plurality of file scanners 108 then retrieves and scans a set of file parts from a file parts bucket 114 of a certain file type to identify malicious content and/or sensitive data. For non-limiting examples, as shown in FIG. 2, the plurality of file scanners 108 can include a link scanner, a binary file scanner, a script scanner, and miscellaneous file part scanner. Once the scanning of the set of file parts is complete, the file scan reporter 110 collects and reports the scan result of the file to the user of the file.

Figure 3:
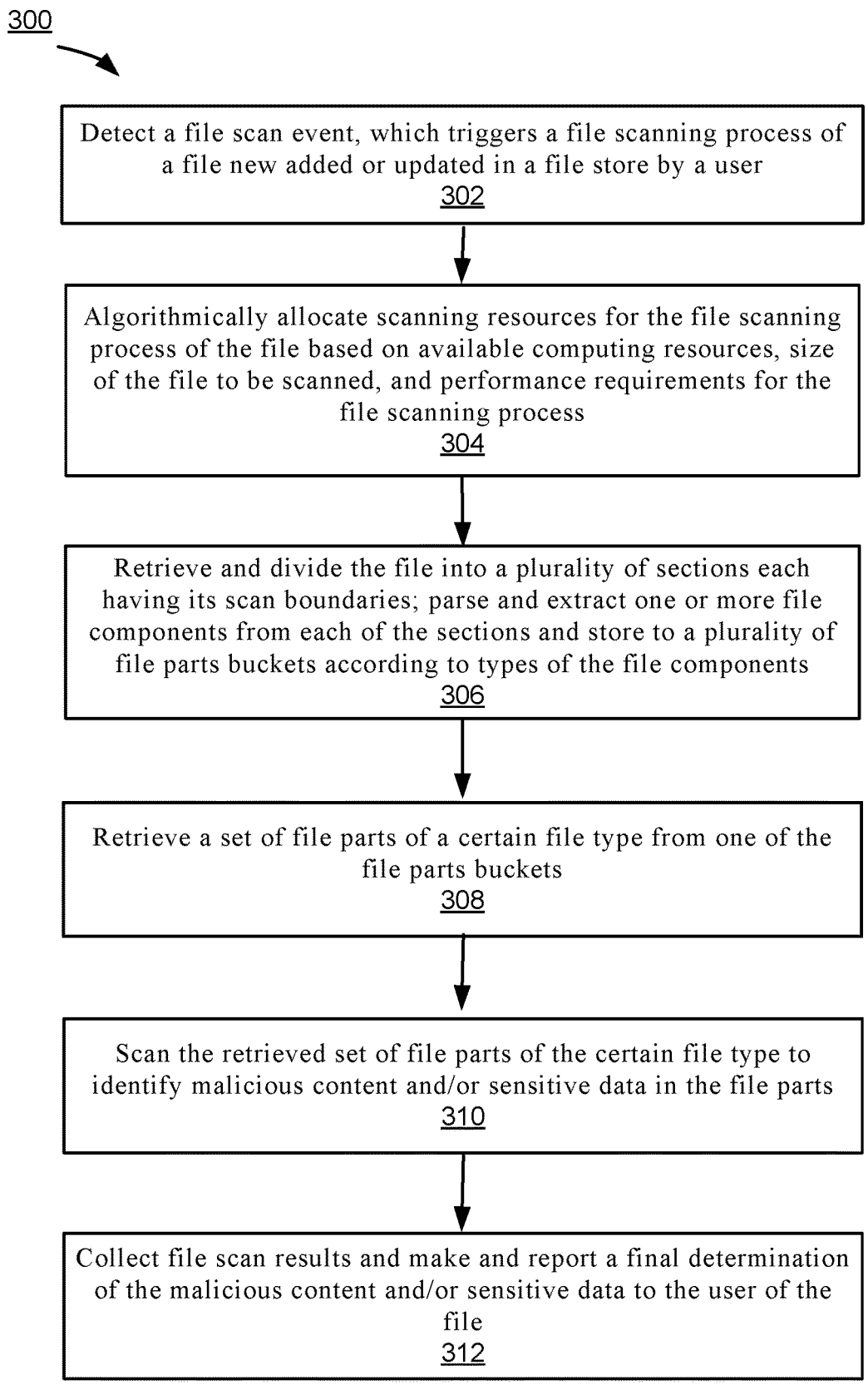
FIG. 3 depicts a flowchart of an example of a process that supports ginormous file scanning according to some embodiments.

FIG. 3 depicts a flowchart 300 of an example of a process to support ginormous file scanning. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 3, the flowchart 300 starts at block 302, where a file scan event is detected, which triggers a file scanning process of a file new added or updated in a file store by a user. The flowchart 300 continues to block 304, where scanning resources are algorithmically allocated for the file scanning process of the file based on available computing resources, size of the file to be scanned, and performance requirements for the file scanning process. The flowchart 300 continues to block 306, wherein the file is retrieved and divided into a plurality of sections each having its scan boundaries and one or more file parts are parsed and extracted from each of the sections and stored to a plurality of file parts buckets according to types of the file components. The flowchart 300 continues to block 308, wherein a set of file parts of a certain file type are retrieved from one of the file parts buckets. The flowchart 300 continues to block 310, wherein the retrieved set of file parts of the certain file type are scanned to identify malicious content and/or sensitive data in the file parts. The flowchart 300 ends at block 312, wherein file scan results are collected, and a final determination of the malicious content and/or sensitive data is made and reported to the user of the file.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for a non-limiting example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

What is claimed is:

1. A system to support ginormous file scanning, comprising: a processor, and a memory that stores:
    a file scan event handler configured to detect a file scan event, which triggers a file scanning process of a file new added or updated in a file store by a user;
    a file scan controller configured to algorithmically allocate allcating scanning resources for the file scanning process of the file based on available computing resources, size of the file to be scanned, and performance requirements for the file scanning process;
    a plurality of file parsers each configured to parse and extract one or more file components from one of a plurality sections of the file and store the extracted file components to a plurality of file parts buckets according to types of the file components, wherein the file is retrieved from the file store and divided into the plurality of sections each having its scan boundaries;
    a plurality of file scanners each configured to:

retrieve a set of file parts of a certain file type from one of the file parts buckets;
scan the retrieved set of file parts of the certain file type to identify malicious content and/or sensitive data in the file parts;
a file scan reporter configured to:
collect file scan results from the plurality of file scanners;
make a final determination of the malicious content and/or sensitive data and report the final determination to the user of the file.

2. The system of claim 1, wherein: the file scan controller is configured to:
make adjustment to the plurality of file parsers and/or file scanners by adding or removing one or more file parsers and/or file scanners from the current set of file parsers and/or file scanners;
provide telemetry information of the adjusted set of the plurality of file parsers and/or file scanners to the file scan event handler during the file scan process.

3. The system of claim 1, further comprising:
said file store configured to store and maintain a plurality of files to be scanned for malicious content and/or sensitive data.

4. The system of claim 3, wherein:
the file store is configured to:
monitor file activities and create the file scan event when a new file is added to the file store or a change/edit happens to an existing file in the file store;
populate the file scan event to the file scan event handler for processing via an event bus or an interrupt mechanism once the file scan event has been created.

5. The system of claim 1, wherein:
the file scan event handler is configured to:
provide metadata of the file to be scanned to the file scan controller wherein such metadata includes one or more of file location in the file store, file ID, file size, file type and last change timestamp;
retrieve the file to be scanned from the file store and provide the file to the plurality of file parsers.

6. The system of claim 1, wherein: the file scan event handler is configured to listen for additional file scan events from the file scan controller related to the file scanning process, wherein such additional file scan events include one or more of file scan completion percentage, file scan success and failure indicators, and output signals related to the identified file contents which can be malicious or sensitive.

7. The system of claim 1, wherein: the file scan event handler is configured to pass certain data including segment information of the file to be scanned directly to the plurality of file parsers via a communication mechanism.

8. The system of claim 1, wherein:
the extracted file parts include one or more of simple text, URL links, binary document portions, binary executable parts, text-based scripts, and other forms of file parts based on Multipurpose Internet Mail Extensions (MIME) classification.

9. The system of claim 8, wherein: each of the plurality of file scanners is configured to scann the file parts of a specific file type including one of URL link, binary executable, text-based script, and other type of file parts based on MIME.

10. The system of claim 9, wherein:
multiple of the plurality of file scanners are utilized to scan the specific type of file parts with no limitation on how many file scanners can be utilized per file type.

11. The system of claim 1, wherein: the plurality of file scanners are configured to scan and analyze their file parts by utilizing one or more of file content analysis, heuristics, user behavior analysis, and sandboxing of identified malicious content and/or sensitive data.

12. The system of claim 1, wherein: the file scan reporter is configured to make the final determination of the malicious content and/or sensitive data using a user-specified/predefined risk criteria.

13. The system of claim 12, wherein: the file scan reporter is configured to make the final determination in a fast-tracked manner based on the file scan results meeting or exceeding one or more minimal satisfactory decision points when the file scan process needs to be completed in real time or within a certain short period of time.

14. A method to support ginormous file scanning, comprising:
detecting a file scan event, which triggers a file scanning process of a file new added or updated in a file store by a user via a file scan event handler;
algorithmically allocating scanning resources for the file scanning process of the file based on available computing resources, size of the file to be scanned, and performance requirements for the file scanning process via a file scan controller;
parsing and extracting one or more file parts from a plurality sections of the file and storing the extracted file parts to a plurality of file parts buckets according to types of the file parts via a plurality of file parsers, wherein the file is retrieved from the file store and divided into the plurality of sections each having its scan boundaries;
retrieving a set of file parts of a certain file type from one of the file parts buckets;
scanning the retrieved set of file parts of the certain file type to identify malicious content and/or sensitive data in the file parts via a plurality of file scanners;
collecting file scan results from the plurality of file scanners;
making a final determination of the malicious content and/or sensitive data and report the final determination to the user of the file.

15. The method of claim 14, further comprising:
making adjustment to the plurality of file parsers and/or file scanners by adding or removing one or more file parsers and/or file scanners from the current set of file parsers and/or file scanners;
providing telemetry information of the adjusted set of the plurality of file parsers and/or file scanners to the file scan event handler during the file scan process.

16. The method of claim 14, further comprising:
monitoring file activities and create the file scan event when a new file is added to the file store or a change/edit happens to an existing file in the file store;
populating the file scan event to the file scan event handler for processing via an event bus or an interrupt mechanism once the file scan event has been created.

17. The method of claim 14, further comprising:
providing metadata of the file to be scanned to the file scan controller wherein such metadata includes one or more of file location in the file store, file ID, file size, file type and last change timestamp;
retrieving the file to be scanned from the file store and provide the file to the plurality of file parsers.

18. The method of claim 14, further comprising:
listening for additional file scan events from the file scan controller related to the file scanning process, wherein such additional file scan events include one or more of file scan completion percentage, file scan success and failure indicators, and output signals related to the identified file contents which can be malicious or sensitive.

19. The method of claim 14, further comprising:
passing certain data including segment information of the file to be scanned directly to the plurality of file parsers via a communication mechanism.

20. The method of claim 14, further comprising:
utilizing the folder structures to create isolation between plug-ins and the first and/or the second applications, wherein each application plug-in is loaded into a separate plug-in domain and runs within the context of the associated folder structure.

21. The method of claim 14, further comprising:
scanning the file components of a specific file type via each of the plurality of file scanners wherein the specific file type includes one of URL link, binary executable, text-based script, and other type of file part based on Multipurpose Internet Mail Extensions (MIME).

22. A non-transitory storage medium having software instructions stored thereon that when executed cause a system to:

detect a file scan event, which triggers a file scanning process of a file new added or updated in a file store by a user;

algorithmically allocate scanning resources for the file scanning process of the file based on available computing resources, size of the file to be scanned, and performance requirements for the file scanning process;

parse and extract one or more file parts from a plurality sections of the file and store the extracted file parts to a plurality of file parts buckets according to types of the file parts, wherein the file is retrieved from the file store and divided into the plurality of sections each having its scan boundaries;

retrieve a set of file parts of a certain file type from one of the file parts buckets;

scan the retrieved set of file parts of the certain file type to identify malicious content and/or sensitive data in the file parts;

collect file scan results from the plurality of file scanners;

make a final determination of the malicious content and/or sensitive data and report the final determination to the user of the file.

* * * * *